(12) United States Patent
Huang et al.

(10) Patent No.: US 12,202,131 B2
(45) Date of Patent: Jan. 21, 2025

(54) BIDIRECTIONAL ENERGY STORAGE DEVICE, ROBOTIC JOINT AND ROBOT

(71) Applicant: UBTECH ROBOTICS CORP LTD, Shenzhen (CN)

(72) Inventors: Zhongkui Huang, Shenzhen (CN); Hongyu Ding, Shenzhen (CN); Xuchao Du, Shenzhen (CN); Zheng Xie, Shenzhen (CN); Wenhua Fan, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 0 days.

(21) Appl. No.: 18/588,055

(22) Filed: Feb. 27, 2024

(65) Prior Publication Data

US 2024/0190025 A1    Jun. 13, 2024

Related U.S. Application Data

(63) Continuation of application No. PCT/CN2021/127152, filed on Oct. 28, 2021.

(30) Foreign Application Priority Data

Aug. 27, 2021    (CN) .......................... 202110998502.8

(51) Int. Cl.
B25J 17/02    (2006.01)
(52) U.S. Cl.
CPC ................................ B25J 17/0258 (2013.01)
(58) Field of Classification Search
CPC .. B25J 17/0258; B25J 19/005; B25J 17/0266; B25J 18/06; B25J 19/002; B25J 19/0025; B25J 19/025
See application file for complete search history.

(56) References Cited

U.S. PATENT DOCUMENTS

2020/0100919 A1* 4/2020 Xiong ........................ F03G 5/06
2020/0206949 A1* 7/2020 Liu ........................... B25J 9/104
(Continued)

FOREIGN PATENT DOCUMENTS

CN    103610524 B    9/2015
CN    106891359 A    6/2017
(Continued)

OTHER PUBLICATIONS

ISR for PCT/CN2021/127152.
Written opinion of ISA for PCT/CN2021/127152.

*Primary Examiner* — Zakaria Elahmadi

(57) ABSTRACT

A bidirectional energy storage device for a joint includes: a sleeve comprising two, opposite open ends; a first sliding member and a second sliding member that are slidably disposed at the open ends of the sleeve, respectively; an elastic member comprising two, opposite ends that are respectively in contact with the first sliding member and the second sliding member; a first telescopic link comprising a first end and an opposite, second end, the first end of the first telescopic link pivotally connected to the first sliding member, the first telescopic link configured to rotate to drive the first sliding member to slide; a second telescopic link comprising a first end and an opposite, second end, the first end of the second telescopic link pivotally connected to the second sliding member, the second telescopic link configured to rotate to drive the second sliding member to slide.

20 Claims, 7 Drawing Sheets

(56) References Cited

U.S. PATENT DOCUMENTS

2020/0206959 A1* 7/2020 Li ................. B25J 17/0241
2020/0207432 A1* 7/2020 Li ................. B62D 57/032

FOREIGN PATENT DOCUMENTS

| CN | 111347458 A | * | 6/2020 | .......... B25J 17/0258 |
| CN | 112025681 A | * | 12/2020 | .......... B25J 17/0258 |
| DE | 102010045525 A1 | * | 4/2011 | .......... B25J 17/0258 |

* cited by examiner

BIDIRECTIONAL ENERGY STORAGE DEVICE, ROBOTIC JOINT AND ROBOT

CROSS REFERENCE TO RELATED APPLICATIONS

The present application is a continuation-application of International Application PCT/CN2021/127152, with an international filing date of Oct. 28, 2021, which claims foreign priority to Chinese Patent Application No. 202110998502.8, filed on Aug. 27, 2021 in the China National Intellectual Property Administration, the contents of all of which are hereby incorporated by reference in its entirety.

TECHNICAL FIELD

The present disclosure generally relates to robots, and in particular relates to a bidirectional energy storage device, robotic joint, and robot.

BACKGROUND

In the field of robotics, an elastic actuator serves as an auxiliary drive unit positioned between a robotic joint and a load. It is capable of storing a portion of the energy output by the joint and releasing it at an appropriate time.

Some conventional elastic actuators are often limited to unidirectional energy storage and release. This means that during operation, they can only store energy when the joint rotates in a single direction and release energy when the joint rotates in the opposite direction. As a result, such elastic actuators can only provide positive work or negative work for the energy output end of the joint. However, in certain operating conditions, such as complex scenarios involving robotic joints, there is a high demand for both positive and negative work outputs from the joint. For instance, when a joint rotates away from a certain initial position, it may need to do a significant amount of positive work (or negative work), and when it rotates in the opposite direction, it might need to do a significant amount of negative work (or positive work). This requires the elastic actuator to be able to output large positive and negative work at the same time. However, some conventional elastic actuators, which can only output unidirectional work, fail to be effective in these scenarios.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
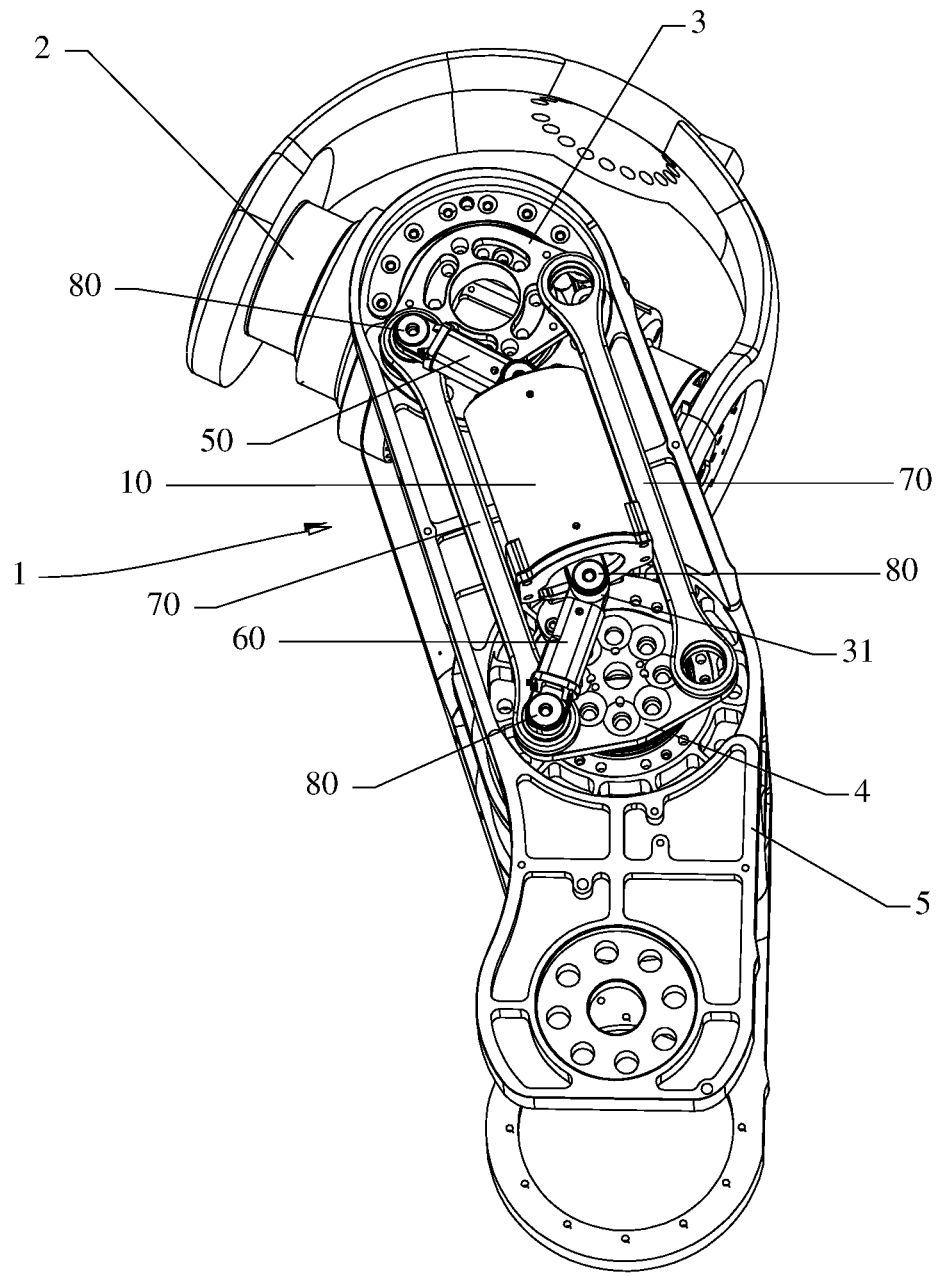
FIG. 1 is a schematic isometric view of a robotic joint according to one embodiment, in which the robotic joint includes a bidirectional energy storage device.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Figure 2:
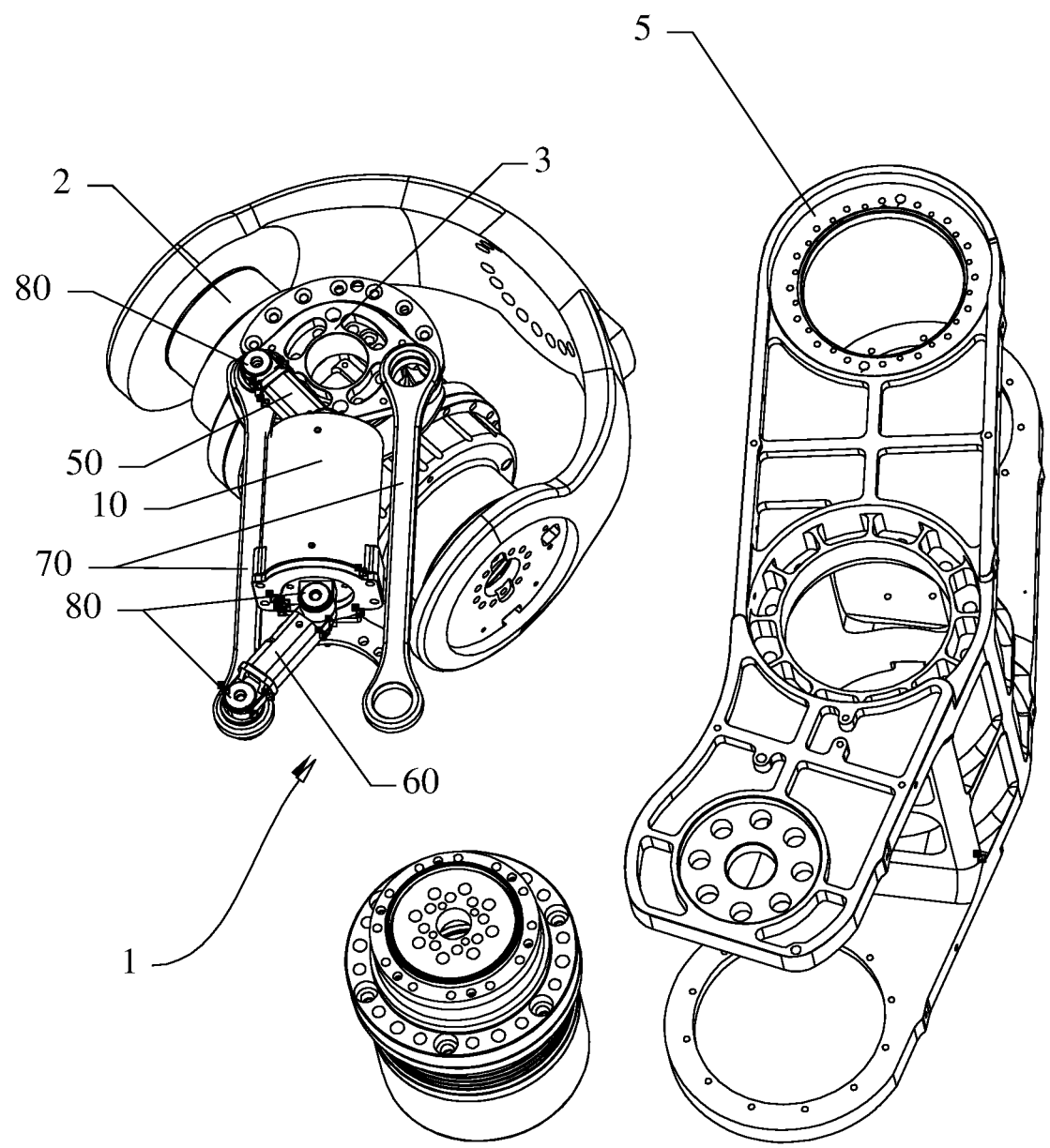
FIG. 2 is an exploded view of the robotic joint of FIG. 1 and shows the cooperative relationship between the bidirectional energy storage device, the actuating device, and the main body of the robotic joint.
Figure 3:
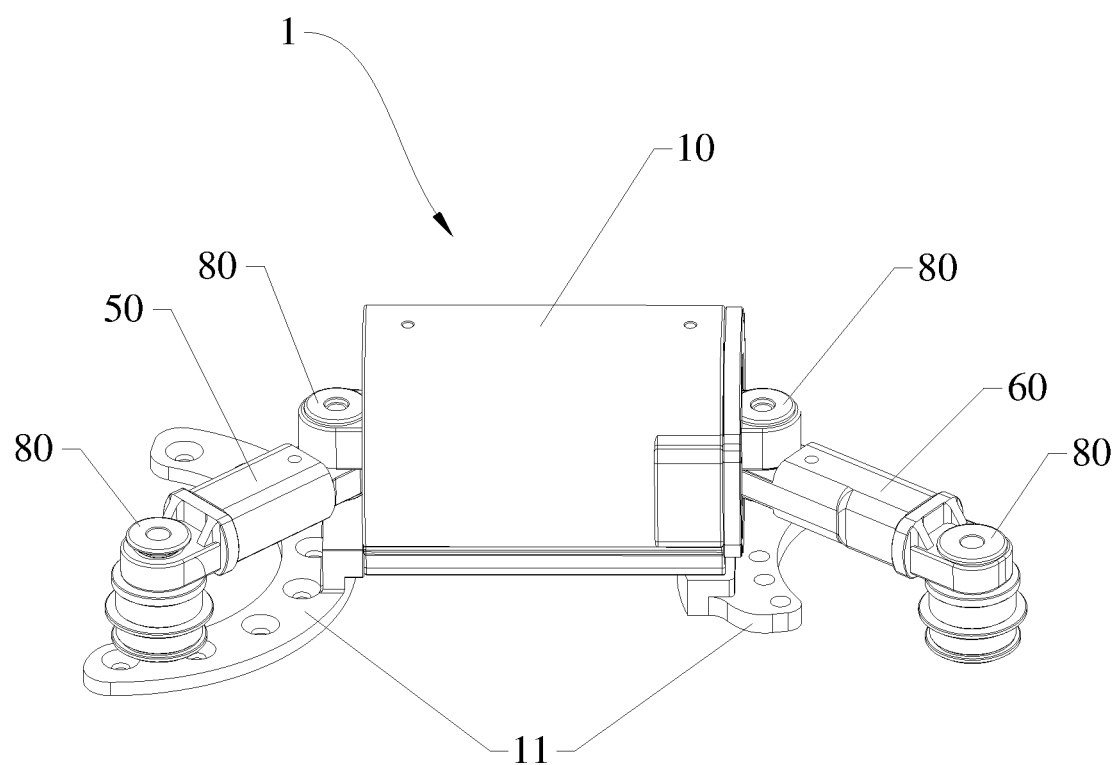
FIG. 3 is a schematic isometric view of a joint bidirectional energy storage device according to one embodiment.
Figure 4:
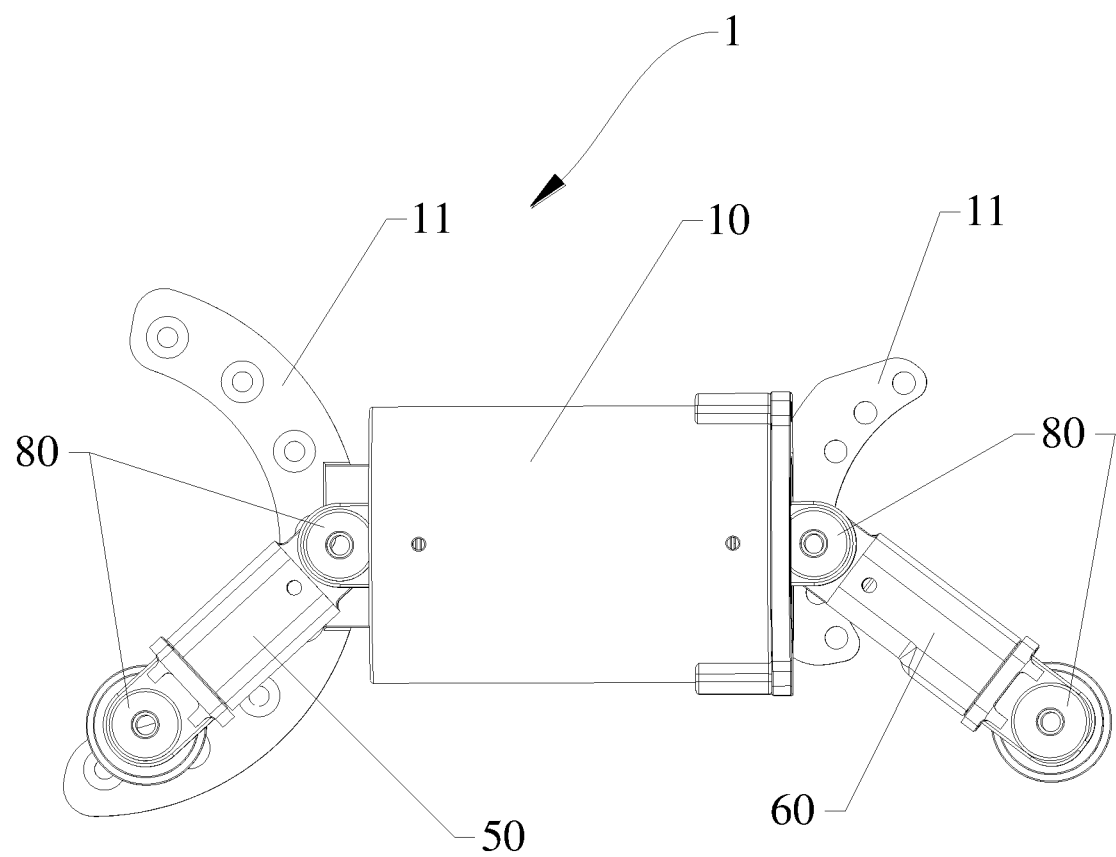
FIG. 4 is a top view of the bidirectional energy storage device of FIG. 3.
Figure 5:
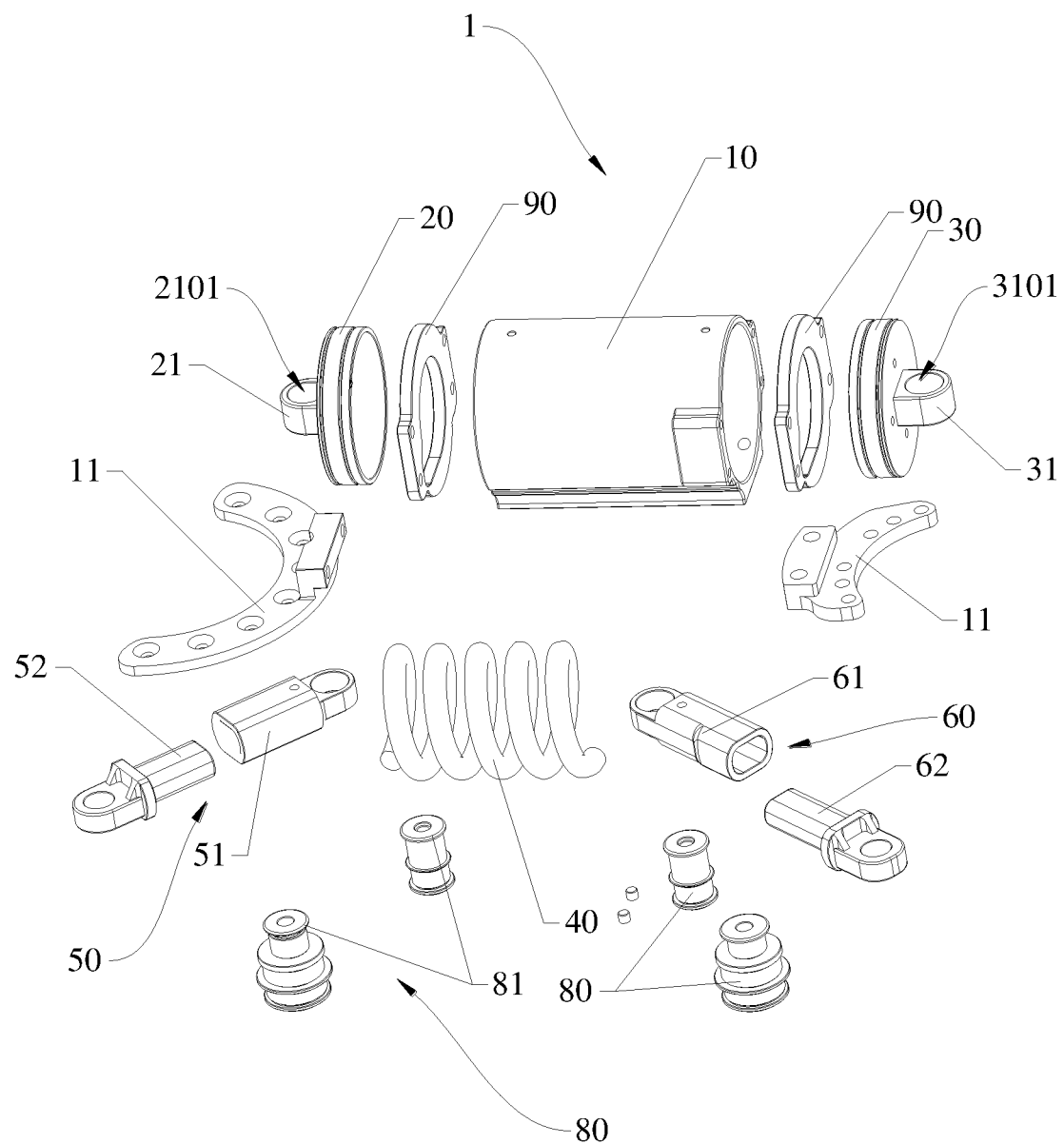
FIG. 5 is an exploded view of the bidirectional energy storage device of FIG. 3.
Figure 6:
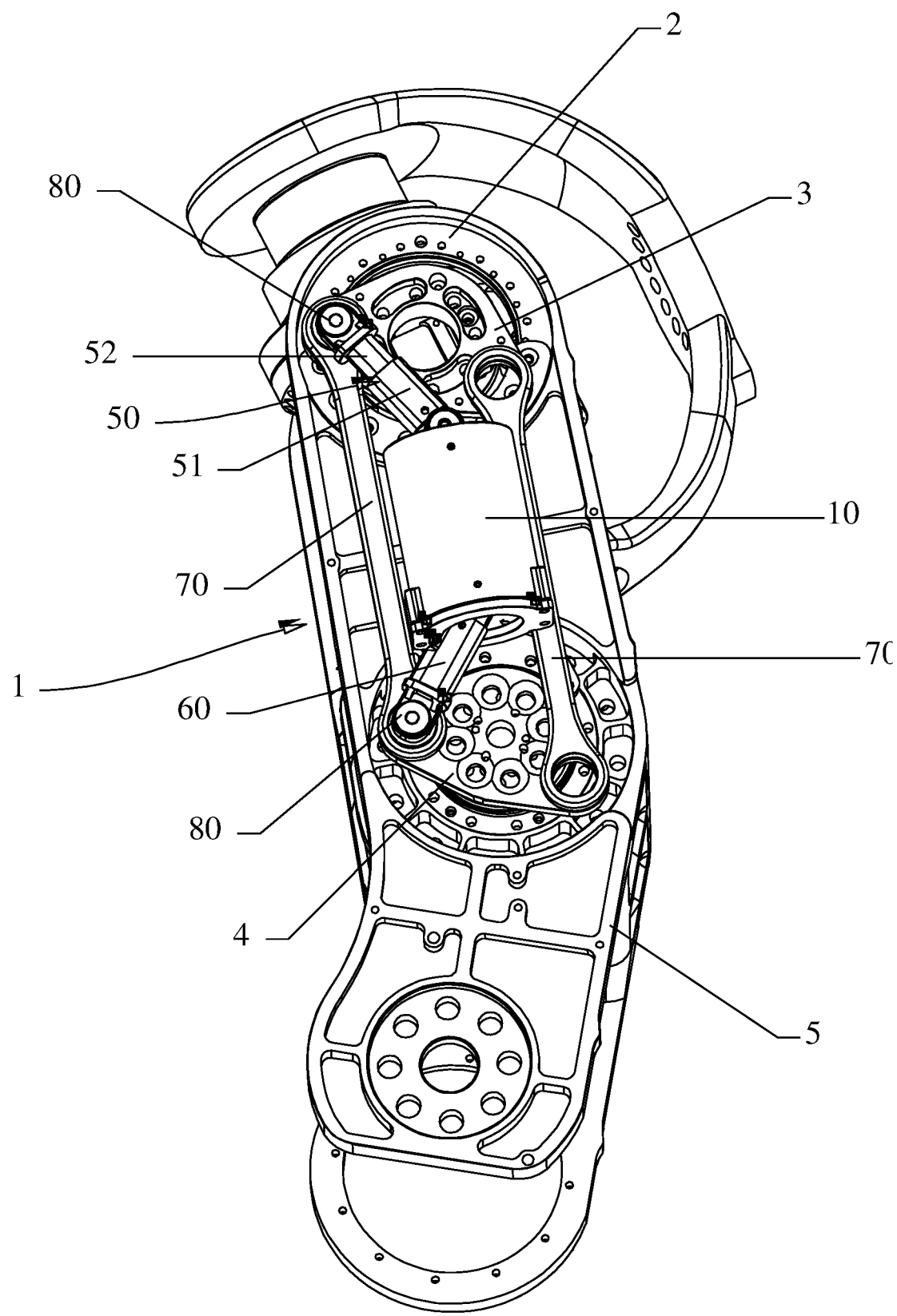
FIG. 6 is a schematic isometric view of the robotic joint in a state of rotating to one side.
Figure 7:
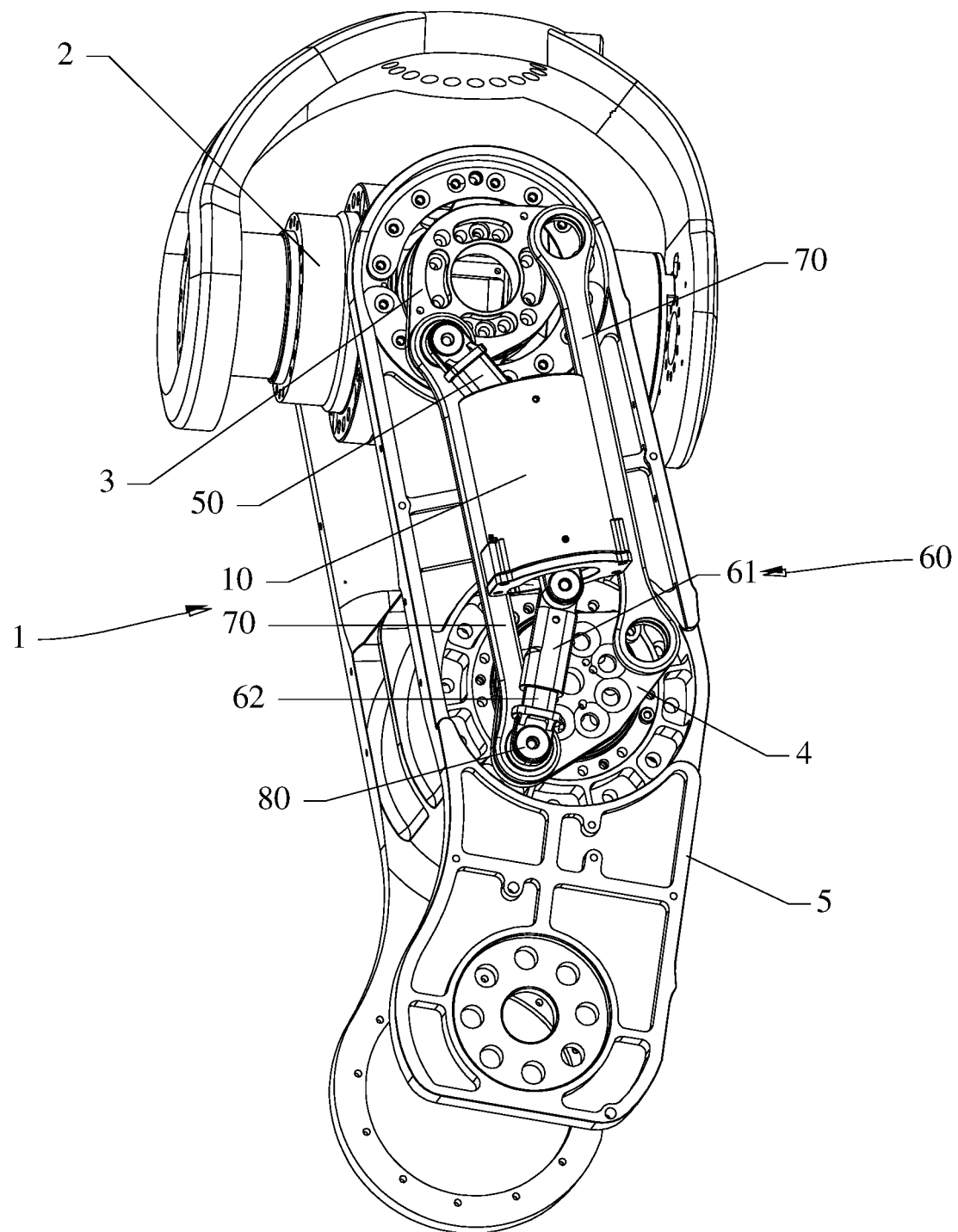
FIG. 7 is a schematic isometric view of the robotic joint in a state of rotating to the other side.

FIGS. 1 and 2 show a bidirectional energy storage device 1 for a joint of a robot according to one embodiment. The bidirectional energy storage device 1 is arranged between the joint and the load to assist the joint to drive the load to perform work. The bidirectional energy storage device 1 may include a sleeve 10, a first sliding member 20, a second sliding member 30, an elastic member 40, a first telescopic link 50, and a second telescopic link 60.

Opposite ends of the sleeve 10 are open ends, and the sleeve 10 defines a receiving chamber. The first sliding member 20 is slidably disposed at one end of the sleeve 10, and the second sliding member 30 is slidably disposed at the other end of the sleeve 10. That is to say, the first sliding member 20 and the second sliding member 30 are respectively disposed at opposite ends of the sleeve 10, and both the first sliding member 20 and the second sliding member 30 can slide axially along the sleeve 10. Opposite ends of the elastic member 40 are respectively in contact with the first sliding member 20 and the second sliding member 30. That is, the elastic member 40 is located between the first sliding member 20 and the second sliding member 30. When either one of the first sliding member 20 and the second sliding member 30 slides along the sleeve 10, the distance between the first sliding member 20 and the second sliding member 30 decreases, and the first sliding member 20 or the second sliding member 30 forces the elastic member 40 to change, thereby realizing energy storage and release.

The first telescopic link 50 is telescopic, meaning its length can change. One end of the first telescopic link 50 is pivotally connected to the first sliding member 20, so that the end of the first telescopic link 50 can rotate relative to the first sliding member 20. The other end of the first telescopic link 50 is pivotally connected to an end rotating member 3 at an end of the joint of the robot, so that the other end of the first telescopic link 50 can rotate relative to the end rotating member 3.

The second telescopic link 60 is telescopic, meaning its length can change. One end of the second telescopic link 60 is pivotally connected to the second sliding member 30, so that the end of the second telescopic link 60 can rotate relative to the second sliding member 30. The other end of the second telescopic link 60 is pivotally connected to an output rotating member 4 at the output end of an actuating device, so that the output rotating member 4 can drive the second telescopic link 60 to rotate. The output rotating member or the second telescopic link 60 is connected to the first telescopic link 50 to drive the first telescopic link 50 to move.

In one embodiment, the bidirectional energy storage device 1 may include at least one swing rod 70, and the opposite ends of the at least one swing rod 70 are respectively connected to the end rotating member 3 and the output rotating member 4. In this way, the output rotating member 4 can drive the first telescopic link 50 to move through the swing rod 70 and the end rotating member 3. In another embodiment, opposite ends of the swing rod 70 may be connected to the first telescopic link 50 and the second telescopic link 60, respectively. Therefore, motion can be transmitted between the first telescopic link 50 and the second telescopic link 60 through the swing rod 70.

The bidirectional energy storage device 1 is mounted at an end of the robotic joint. Specifically, two fixing members 11 are arranged at opposite ends of the sleeve 10. One of the fixing members 11 is connected to end of the robotic joint. The robotic joint may include a main body 2, the end rotating member 3, the actuating device and the output rotating member 4. The end rotating member 3 is rotatably mounted on an end of the main body 2. The actuating device can be a servo. The output rotating member 4 is connected to the output end of the actuating device, so that the actuating device can drive the output rotating member 4 to rotate. In one embodiment, each of the fixing members 11 is a roughly arc-shaped plate, and one of the fixing members 11 of the sleeve 10 is fixed to an end of the main body 2 through fasteners. The arc-shaped fixing member 11 and the shape of the end of the main body 2 are closely matched, which is conducive to their fitting and fixation. In another embodiment, the fixing member 11 may be of other shapes or other structures. The state shown in FIG. 1 of the bidirectional energy storage device 1 is referred to as the initial state (also referred to as the zero-point state). When the actuating device drives the output rotating member 4 to rotate to one side relative to the initial state, for example, in clockwise direction, the output rotating member 4 drives the second telescopic link 60 to rotate, and the second telescopic link 60 then drives the second sliding member 30 to slide along the sleeve 10. The second sliding member 30 then acts on the elastic element 40, causing the elastic element 40 to change, thereby storing energy. Moreover, the actuating device sequentially drives the first telescopic link 50 to rotate and extend its length through the output rotating member 4 and the swing rod 70. The first telescopic link 50 further drives the joint to rotate through the end rotating member 3.

When the actuating device drives the output rotating member 4 to rotate to the other side relative to the initial state, for example, in counterclockwise direction, the output rotating member 4 drives the second telescopic link 60 to rotate. The second telescopic link 60 rotates and simultaneously performs telescopic movement in the length direction. At the same time, the actuating device drives the first telescopic link 50 to rotate through the output rotating member 4 and the swing rod 70. When the first telescopic link 50 rotates, it drives the first sliding member 20 to slide along the sleeve 10. The first sliding member 20 then acts on the elastic element 40, causing the elastic element to change, thereby storing energy. It can be seen that no matter which direction the actuating device drives the output rotating member 4 to rotate, the output rotating member 4 can directly or indirectly drive one of the first telescopic link 50 and the second telescopic link 60 to extend and retract. The other one of the first telescopic link 50 and the second telescopic link 60 correspondingly drives the first sliding member 20 or the second sliding member 30 to slide axially along the sleeve 10. As a result, the elastic member 40 changes and stores energy. The elastic member 40 can store energy in two directions. In the state where the elastic member 40 stores energy, if the output rotating member 4 rotates in the reverse direction, it can drive one of the first telescopic link 50 or the second telescopic link 60 to perform a reverse telescopic movement. The elastic member 40 drives the first sliding member 20 or the second sliding member 30 to slide reversely, until the first telescopic link 50 or the second telescopic link 60 returns to the initial state. The elastic member 40 then returns to the initial state, thereby releasing the energy stored in the elastic member 40.

Compared with some conventional elastic actuators, the bidirectional energy storage device 1 can realize bidirectional energy storage and bidirectional work. It can simultaneously meet the complex working conditions of outputting large positive work (or negative work) when the joint rotates forward and outputting large negative work (or positive work) when rotating reversely.

In one embodiment, the elastic member 40 is a compression spring arranged inside the sleeve 10. The opposite ends of the compression spring respectively abut against the first sliding member 20 and the second sliding member 30 located at opposite ends of the sleeve 10. When the first telescopic link 50 rotates while pushing the first sliding member 20 to slide axially along the sleeve 10 toward the inside of the sleeve 10, or when the second telescopic link 60 rotates and pushes the second sliding member 30 to slide axially along the sleeve 10 toward the inside of the sleeve 10, the compression spring is compressed and stores energy. On the contrary, when the first telescopic link 50 or the second telescopic link 60 rotates in the opposite direction, the compression spring pushes the first sliding member 20 or the second sliding member 30 to slide reversely under its own elastic force until the compression spring returns to the initial state, thereby realizing the release of energy. By using a spring as the elastic member 40 for storing and releasing energy, the structure is simple, easy to manufacture and easy to assemble.

In one embodiment, the side wall of the sleeve 10 is provided with long and narrow sliding grooves, and the first sliding member 20 and the second sliding member 30 respectively have connecting portions extending out of the sleeve 10 through the sliding grooves. The elastic element 40 is a compression spring and is arranged on the outer lateral wall of the sleeve 10. Opposite ends of the compression spring respectively abut against the connecting portions of the first sliding member 20 and the second sliding member 30, so that when the first sliding member 20 or the second sliding member 30 slides, the connecting portions push the compression spring to compress and deform.

In another embodiment, the elastic member 40 is a magnetic spring. The magnetic spring includes a number of magnets that are slidably arranged in the sleeve 10 along the axial direction of the sleeve 10. The magnetic properties of each two adjacent magnets on opposite sides are opposite, so that each two adjacent magnets repel each other. When the first telescopic link 50 rotates while pushing the first sliding member 20 to slide axially along the sleeve 10 toward the inside of the sleeve 10, or when the second telescopic link 60 rotates and pushes the second sliding member 30 to slide axially along the sleeve 10 toward the inside of the sleeve 10, the spacing between the magnets of the magnetic spring is compressed and reduced, thereby storing energy. On the contrary, when the first telescopic link 50 or the second telescopic link 60 rotates in the opposite direction, since each two adjacent magnets of the magnetic spring repel each other, the magnets move away from each other under the action of magnetic force, and the distances thereof increase. As a result, the magnetic spring pushes the first sliding member 20 or the second sliding member 30 to slide in the opposite direction until the magnetic spring returns to the initial state, thereby realizing the release of energy. By using a magnetic spring as the elastic member 40, the structure is simple and easy to assemble. The magnetic force is used to store and release energy. The magnetic spring will not be easily over-deformed and cause structural damage like conventional springs during use, and has a longer service life.

In another embodiment, the elastic member 40 is a leaf spring. Opposite ends of the leaf spring member abut the first sliding member 20 and the second sliding member 30 respectively. When the first telescopic link 50 rotates while pushing the first sliding member 20 to slide axially along the sleeve 10 toward the inside of the sleeve 10, or when the second telescopic link 60 rotates and pushes the second sliding member 30 to slide axially along the sleeve 10 toward the inside of the sleeve 10, opposite ends of the leaf spring are forced to bend and deform, thereby realizing bidirectional energy storage. On the contrary, when the first telescopic link 50 or the second telescopic link 60 rotates in the opposite direction, the leaf spring has a tendency to restore its shape and pushes the first sliding member 20 or the second sliding member 30 to slide in the opposite direction until the shape of the leaf spring is restored, the energy is released. By using a leaf spring as the elastic member 40 for storing and releasing energy, the structure is simple, easy to manufacture and easy to assemble. In other embodiments, the elastic member 40 may be of other components capable of storing and releasing energy.

In one embodiment, both the first sliding member 20 and the second sliding member 30 are sliding plates received in the sleeve 10. The sliding plates are round, and the cross-section of the sliding plates match the cross-sectional shape of the sleeve 10. The sliding plates are slidably arranged in the ends of the sleeve 10, such that the sliding plates can slide axially along the sleeve 10 within the sleeve 10 under the action of a push force. The opposite ends of the elastic member 40 are respectively in contact with the side walls of the two sliding plates. The elastic member 40 and the sliding plates can abut against each other, and the round sliding plates can facilitate stable force transmission.

In one embodiment, the side of the first sliding member 20 facing the outside of the sleeve 10 has a protruding mounting member 21, and the mounting member 21 defines a mounting hole 2101. Similarly, the side of the second sliding member 30 facing the outside of the sleeve 10 has a protruding mounting member 31, and the mounting member 31 defines a mounting hole 3101. The bidirectional energy storage device 1 may include a number of rotating shafts 80, and the rotating shafts 80 are cylindrical. One of the rotating shafts 80 passes through the mounting hole 2101 in the first sliding member 20. One end of the first telescopic link 50 is provided with a through hole and is arranged around the rotating shaft 80. Similarly, another rotating shaft 80 passes through the mounting hole 3101 in the second sliding member 30, and one end of the second telescopic link 60 is provided with a through hole and is arranged around the rotating shaft 80. In this way, the pivot connection between the first telescopic link 50 and the first sliding member 20 and between the second telescopic link 60 and the second sliding member 30 is achieved, allowing the first telescopic link 50 and the second telescopic link 60 to rotate around the rotating shafts 80.

In one embodiment, a limiting flange 81 is provided at an end of each rotating shaft 80. The limiting flanges 81 can limit the first telescopic link 50 and the second telescopic link 60 to prevent the first telescopic link 50 and the second telescopic link 60 from disengaging from the corresponding rotating shafts 80.

In one embodiment, the first telescopic link 50 and the end rotating member 3 are pivotally connected to each other through one rotating shaft 80. The second telescopic link 60 and the output rotating member 4 are pivotally connected to each other through one rotating shaft 80.

Referring to FIGS. 1 and 2, in one embodiment, the bidirectional energy storage device 1 may include a number of stopping members 90. The stopping members 90 are fixed to opposite ends of the sleeve 10 to prevent the first sliding member 20 and the second sliding member 30 from disengaging from the sleeve 10.

In one embodiment, each stopping member 90 is an annular ring, and the annular ring is attached and fixed to a corresponding end of the sleeve 10. The cross-sectional dimensions of the first sliding member 20 and the second sliding member 30 are both larger than the hole of the annular ring. Therefore, the first sliding member 20 and the second sliding member 30 cannot pass through the annular ring, thereby preventing the first sliding member 20 and the second sliding member 30 from sliding out from the ends of the sleeve 10.

Referring to FIG. 2, in one embodiment, the first telescopic link 50 may include a tubular member 51 and a rod 52. The tubular member 51 defines a chamber therein. One end of the tubular member 51 is an open end and the other end is a closed end. Thus, the opposite ends of the tubular member 51 are an end surface and a groove surface respectively. The end surface of the tubular member 51 is provided with a through hole and is rotatably connected to one of the rotating shafts 80. One end of the rod 52 is an axial surface and is provided with a through hole. The axial surface of the rod 52 is rotatably arranged around another rotating shaft 80. The other end of the rod 52 is an abutting surface and extends into the chamber of the tubular member 51 to be slidable along the tubular member 51 to realize the extension and retraction of the first telescopic link 50.

Similarly, in one embodiment, the second telescopic link 60 may include a tubular member 61 and a rod 62. The tubular member 61 defines a chamber therein. One end of the tubular member 61 is an open end and the other end is a closed end. Thus, the opposite ends of the tubular member 61 are an end surface and a groove surface respectively. The end surface of the tubular member 61 is provided with a through hole and is rotatably connected to one of the rotating shafts 80. One end of the rod 62 is an axial surface and is provided with a through hole. The axial surface of the rod 62 is rotatably arranged around another rotating shaft 80. The other end of the rod 62 is an abutting surface and extends into the chamber of the tubular member 61 to be slidable along the tubular member 61 to realize the extension and retraction of the second telescopic link 60.

Specifically, in the initial state shown in FIG. 1 (also referred to as the zero-point state), the abutting surface of the rod 52 is in contact with the end surface of the tubular member 51, and the abutting surface of the rod 62 is in contact with the end surface of the tubular member 61. When the first telescopic link 50 and the second telescopic link 60 rotate to one side relative to the initial state, for example, in clockwise direction, the abutting surface of the rod 62 and the end surface of the tubular member 61 still abut against each other, and the abutting surface of the rod 52 and the end surface of the tubular member 51 gradually move away from each other. The abutting surface of the rod 52 slides in the tubular member 51, thereby realizing the extension of the first telescopic link 50. When the first telescopic link 50 and the second telescopic link 60 rotate in the opposite direction and return to the initial state, the abutting surface of the rod 62 and the end surface of the tubular member 61 still abut against each other, and the abutting surface of the rod 52 and the end surface of the tubular member 51 gradually move toward each other until they come into contact with each other. The abutting surface of the rod 52 slides in the tubular member 51, thereby realizing the retraction of the first telescopic link 50.

When the first telescopic link 50 and the second telescopic link 60 rotate to the other side relative to the initial state, for example, in counterclockwise direction, the abutting surface of the rod 52 and the end surface of the tubular member 51 still abut against each other, and the abutting surface of the rod 62 is separate from the end surface of the tubular member 61. The abutting surface of the rod 62 slides in the tubular member 61, thereby realizing the extension of the second telescopic link 60. When the first telescopic link 50 and the second telescopic link 60 rotate in the opposite direction and return to the initial state, the abutting surface of the rod 52 and the end surface of the tubular member 51 still abut against each other, and the abutting surface of the rod 62 and the end surface of the tubular member 61 gradually move toward each other until they come into contact with each other. The abutting surface of the rod 62 slides in the tubular member 61, thereby realizing the retraction of the second telescopic link 60.

It should be noted that the first telescopic link 50 and the second telescopic link 60 may adopt other reasonable telescopic structures according to actual needs. For example, the first telescopic link 50 may include two rods, one of which is provided with a slide groove, and the other one of which is provided with a slide block and is slidably received in the slide groove. As a result, the two rods can slide relative to each other, forming a telescopic structure that can extend and retract. The structure of the second telescopic link 60 can be the same as that of the first telescopic link 50.

In one embodiment, the first telescopic link 50 and the second telescopic link 60 have the same length. In an alternative embodiment, the lengths of the first telescopic link 50 and the second telescopic link 60 may be different. According to the actual needs, when the degrees of rotation to either side of the robotic joint are different, the lengths of the first telescopic link 50 and the second telescopic link 60 can be reasonably set.

In one embodiment, two first telescopic links 50 and two second telescopic links 60 are employed. One end of each of the two first telescopic links 50 is pivotally connected to first sliding member 20 through the same rotating shaft 80. Two limiting flanges 81 are provided on opposite ends of the rotating shaft 80. The middle portion of the rotating shaft 80 is received in the mounting hole 2101 of a corresponding mounting member 21, with the limiting flanges 81 on opposite ends of the rotating shaft 80 located on opposite ends of the mounting member 21. An end of one of the first telescopic links 50 is limited between the mounting member 21 and the limiting flange 81 on one end of the rotating shaft 80. The end of the other first telescopic link 50 is limited between the mounting member 21 and the limiting flange 81 on the other end of the rotating shaft 80. In this way, the ends of the two first telescopic links 50 are respectively located on opposite ends of the mounting member 21 and are limited by the limiting flanges 81. The other ends of the two first telescopic links 50 are respectively pivotally connected to different positions of the end rotating member 3 at the end of the joint through two rotation shafts 80.

Similarly, one end of each of the two second telescopic links 60 is connected to the second sliding member 30 through the same rotating shaft 80. Limiting flanges 81 are provided on opposite ends of the rotating shaft 80, and the middle portion of the rotating shaft 80 is received in the mounting hole 3101 of the mounting member 31, with the limiting flanges 81 on opposite ends of the rotating shaft 80 located on opposite ends of the mounting member 31. An end of one of the second telescopic links 60 is limited between the mounting member 31 and the limiting flange 81 on one end of the rotating shaft 80. The end of the other second telescopic link 60 is limited between the mounting member 31 and the limiting flange 81 on the other end of the rotating shaft 80. In this way, the ends of the two second telescopic links 60 are respectively located on opposite ends of the mounting member 31 and are limited by the limiting flanges 81. The other ends of the two second telescopic links 60 are respectively pivotally connected to different positions of the output rotating member 4 at the output end of the actuating device through two rotating shafts 80.

It can be understood that in the scenario where two first telescopic links 50 and two second telescopic links 60 are employed, when the actuating device drives the output rotating member 4 to rotate to one side, for example, in clockwise direction, the output rotating member 4 drives the two second telescopic links 60 to rotate simultaneously. At this time, one of the second telescopic links 60 drives the second sliding member 30 to slide along the sleeve 10. The second sliding member 30 then acts on the elastic member 40, causing the elastic member 40 to change, thereby storing energy. Another second telescopic link 60 extends/retracts while rotating. The output rotating member 4 or the second telescopic link 60 drives the two first telescopic links 50 to rotate through the swing rod 70. At this time, one of the first telescopic links 50 extends/retracts while rotating, and the other first telescopic link 50 drives the first sliding member 20 to slide along the sleeve 10. The two first telescopic links 50 drive the robotic joint to rotate through the end rotating member 3. It can be understood that in this case, the first sliding member 20 and the second sliding member 30 both slide along the sleeve 10 and slide toward each other. Compared with the case where there is only one first telescopic link 50 and one second telescopic link 60, the deformation amount of the elastic member 40 is doubled, so that more energy can be stored. Similarly, when the actuating device drives the output rotating member 4 to rotate to the other side, for example, in counterclockwise direction, the amount of deformation of the elastic member 40 doubles, so that more energy can be stored.

In the state where the elastic member 40 stores energy, if the output rotating member 4 rotates in the opposite direction, it can drive one of the first telescopic links 50 and one of the second telescopic links 60 to extend/contact in the opposite direction. The elastic member 40 synchronously drives the first sliding member 20 and the second sliding member 30 to slide in opposite directions. The first sliding member 20 and the second sliding member 30 are moved away from each other until the first telescopic link 50 and the second telescopic link 60 are restored to the initial state, and the elastic member 40 returns to its original state, thereby doubling the energy stored in the elastic member 40. By arranging two first telescopic links 50 and two second telescopic links 60, it can meet the complex working conditions in which a robotic joint needs to output a large positive work (or negative work) when it rotates forward, and a large negative work (or positive work) when it rotates reversely.

In one embodiment, two swing rods 70 are employed. The two swing rods 70 are respectively located on opposite sides of the sleeve 10 and are arranged in parallel along the axial direction of the sleeve 10. For the case where the number of the first telescopic link 50 and the second telescopic link 60 is one, the opposite ends of one of the swing rods 70 are connected to the end rotating member 3 and the output rotating member 4 respectively; and the opposite ends of the other swing rod 70 are connected to the first telescopic link 50 and the second telescopic link 60 respectively, or the opposite ends of the other swing rod 70 may be connected to the end rotating member 3 and the output rotating member 4 respectively. For the case where two first telescopic links 50 and two second telescopic links 60 are employed, the opposite ends of each swing rod 70 are respectively connected to the end rotating member 3 and the output rotating member 4, or the opposite ends of each swing rod 70 are connected to the first telescopic link 50 and the second telescopic link 60 respectively. By arranging the swing bar 70 to drive the first telescopic link 50 to move, the stability and integrity of the structure can be enhanced, which is beneficial to the stable transmission of force.

In one embodiment, both the first telescopic link 50 and the second telescopic link 60 are provided with vent holes and feature a motion avoidance design. The first sliding member 20 and the second sliding member 30 are provided with vent holes and oil grooves. Correspondingly, the sleeve 10 defines small holes positioned in alignment with the oil grooves of the first and second sliding members, facilitating the addition of lubricating oil into the oil grooves. An oil-free bushing is arranged between the through hole at the respective end of the first telescopic link 50 and the second telescopic link 60 and the rotating shaft 80. In order to simplify the structure, the end of the first telescopic link 50 away from the sleeve 10 and the end of the swing rod 70, the end rotating member 3, and the rotating member of the main body 2 can be jointly arranged around the corresponding rotating shaft 80. Between any two adjacent parts among the end of the first telescopic link 50, the end of the swing rod 70, the end rotating member 3, and the rotating member of the main body 2, there are washers placed. Similarly, the end of the second telescopic link 60 away from the sleeve 10, the end of the swing rod 70 and the output rotating member 4 can be jointly arranged around the corresponding rotating shaft 80. Between any two adjacent parts among the end of the second telescopic link 60, the end of the swing rod 70, and the output rotating member 4, there are washers placed.

This present disclosure further provides a robotic joint, which includes the above-mentioned bidirectional energy storage device 1, the main body 2, the actuating device, the end rotating member 3, and the output rotating member 4. The end rotating member 3 is rotatably mounted on the end of the main body 2. The output rotating member 4 is rotatably mounted on the output end of the actuating device. The first telescopic link 50 is pivotally connected to the end rotating member 3 through one rotating shaft 80, and the second telescopic link 60 is pivotally connected to the output rotating member 4 through one rotating shaft 80. The robot joint may further include two support members 5. The bidirectional energy storage device 1, the main body 2, the actuating device, the end rotating member 3 and the output rotating member 4 are all joined to the support members 5.

In one embodiment, the main body 2 is a hip joint, and the actuating device is a servo. The hip joint and the servo are respectively located at opposite ends of the joint bidirectional energy storage device 1. The hip joint is connected to the end rotating member 3, and the servo is connected to the output rotating member 4.

Since the robotic joint incorporates all the technical solutions from the aforementioned implementations, it likewise benefits from all the advantageous effects brought about by these implementations, which will not be repeated here.

The present disclosure further provides a robot, which includes the above-mentioned bidirectional energy storage device 1. Since the robot incorporates all the technical solutions from the aforementioned implementations, it likewise benefits from all the advantageous effects brought about by these implementations, which will not be repeated here.

The bidirectional energy storage device 1 and the robotic joint and robot including the bidirectional energy storage device 1 have the following advantages: 1) The elastic member 40 can store and release energy in specific intervals of the robotic joint, thereby enhancing the joint's burst capability at crucial moments; 2) The bidirectional energy storage device 1 utilizes the clutch conversion of a linkage mechanism to realize bidirectional energy storage and release in the robotic joint. This addresses the limitation of some conventional elastic actuators, which only support unidirectional energy storage and opposite direction release. The bidirectional energy storage device 1 can assist the robotic joint to perform positive and negative work on the load, and can meet the load's demand for positive and negative work under complex working conditions; 3) The bidirectional energy storage device 1 assists the main body 2 in performing work on the load, reducing the power demand on the joint, improving the output performance of the robot through a mechanical structure, and achieving cost reduction and energy saving; 4) The bidirectional energy storage device 1 is of modular design and can be directly mounted between the robotic joint and the load. This flexibility means it can be installed as needed and removed when not required, facilitating customization and adaptation to various applications without extensive modifications.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A bidirectional energy storage device for a joint, comprising:
   a sleeve comprising two, opposite open ends;
   a first sliding member and a second sliding member that are slidably disposed at the open ends of the sleeve, respectively;
   an elastic member comprising two, opposite ends that are respectively in contact with the first sliding member and the second sliding member;

a first telescopic link comprising a first end and an opposite, second end, the first end of the first telescopic link pivotally connected to the first sliding member, the first telescopic link configured to rotate to drive the first sliding member to slide; and a second telescopic link comprising a first end and an opposite, second end, the first end of the second telescopic link pivotally connected to the second sliding member, the second telescopic link configured to rotate to drive the second sliding member to slide;

wherein the second ends of the first telescopic link and the second telescopic link are respectively pivotally connected to an end rotating member at an end of the joint and an output rotating member at an output end of an actuating device, and the output rotating member or the second telescopic link is connected to the first telescopic link to drive the first telescopic link to move.

2. The bidirectional energy storage device of claim 1, further comprising at least one swing rod, wherein each of the at least one swing rod comprises two ends that are respectively connected to the first telescopic link and the second telescopic link, or the two ends of each of the swing rod are respectively connected to the end rotating member and the output rotating member.

3. The bidirectional energy storage device of claim 2, wherein the at least one swing rod is two in number, the two swing rods are respectively located at opposite sides of the sleeve and are arranged in parallel along an axial direction of the sleeve.

4. The bidirectional energy storage device of claim 1, wherein the elastic member is a compression spring, or the elastic element is a magnetic spring that comprises a plurality of magnets slidably arranged in the sleeve along an axial direction of the sleeve.

5. The bidirectional energy storage device of claim 1, wherein the first sliding member and the second sliding member are slidably received in the sleeve.

6. The bidirectional energy storage device of claim 5, further comprising two rotating shafts, wherein the first sliding member and the second sliding member each comprises a mounting member that defines a mounting hole, the two rotating shafts pass through the mounting holes of the first sliding member and the second sliding member, respectively, and the first telescopic link and the second telescopic link are rotatably connected to the two rotating shafts, respectively.

7. The bidirectional energy storage device of claim 1, further comprising two stopping members, wherein the two stopping members are respectively fixed on the open ends of the sleeve to prevent the first sliding member and the second sliding member from disengaging from the sleeve.

8. The bidirectional energy storage device of claim 7, wherein each of the stopping members is a ring abutting against a corresponding one of the open ends.

9. The bidirectional energy storage device of claim 1, wherein the first telescopic link and the second telescopic link each comprise a tubular member and a rod that is partly received in the tubular member and slidable along the tubular member.

10. A robotic joint comprising:
a main body;
an actuating device;
an end rotating member rotatably connected to an end of the main body;
an output rotating member rotatably connected to an output end of the actuating device; and
a bidirectional energy storage device comprising:
a sleeve comprising two, opposite open ends;
a first sliding member and a second sliding member that are slidably disposed at the open ends of the sleeve, respectively; and
an elastic member comprising two, opposite ends that are respectively in contact with the first sliding member and the second sliding member;
a first telescopic link comprising a first end and an opposite, second end, the first end of the first telescopic link pivotally connected to the first sliding member, the first telescopic link configured to rotate to drive the first sliding member to slide;
a second telescopic link comprising a first end and an opposite, second end, the first end of the second telescopic link pivotally connected to the second sliding member, the second telescopic link configured to rotate to drive the second sliding member to slide;
wherein the second ends of the first telescopic link and the second telescopic link are respectively pivotally connected to the end rotating member and the output rotating member, and the output rotating member or the second telescopic link is connected to the first telescopic link to drive the first telescopic link to move.

11. The robotic joint of claim 10, wherein the bidirectional energy storage device further comprises at least one swing rod, each of the at least one swing rod comprises two ends that are respectively connected to the first telescopic link and the second telescopic link, or the two ends of each of the swing rod are respectively connected to the end rotating member and the output rotating member.

12. The robotic joint of claim 11, wherein the at least one swing rod is two in number, the two swing rods are respectively located at opposite sides of the sleeve and are arranged in parallel along an axial direction of the sleeve.

13. The robotic joint of claim 10, wherein the elastic member is a compression spring, or the elastic element is a magnetic spring that comprises a plurality of magnets slidably arranged in the sleeve along an axial direction of the sleeve.

14. The robotic joint of claim 10, wherein the first sliding member and the second sliding member are slidably received in the sleeve.

15. The robotic joint of claim 14, further comprising two rotating shafts, wherein the first sliding member and the second sliding member each comprises a mounting member that defines a mounting hole, the two rotating shafts pass through the mounting holes of the first sliding member and the second sliding member, respectively, and the first telescopic link and the second telescopic link are rotatably connected to the two rotating shafts, respectively.

16. The robotic joint of claim 10, further comprising two stopping members, wherein the two stopping members are respectively fixed on the open ends of the sleeve to prevent the first sliding member and the second sliding member from disengaging from the sleeve.

17. A robot comprising:
a robotic joint comprising:
a main body;
an actuating device;
an end rotating member rotatably connected to an end of the main body;
an output rotating member rotatably connected to an output end of the actuating device; and
a bidirectional energy storage device comprising:
a sleeve comprising two, opposite open ends;

a first sliding member and a second sliding member that are slidably disposed at the open ends of the sleeve, respectively;

an elastic member comprising two, opposite ends that are respectively in contact with the first sliding member and the second sliding member;

at least one first telescopic link comprising a first end and an opposite, second end, the first end of the at least one first telescopic link pivotally connected to the first sliding member, the at least one first telescopic link configured to rotate to drive the first sliding member to slide; and at least one second telescopic link comprising a first end and an opposite, second end, the first end of the at least one second telescopic link pivotally connected to the second sliding member, the at least one second telescopic link configured to rotate to drive the second sliding member to slide;

wherein the second ends of the at least one first telescopic link and the at least one second telescopic link are respectively pivotally connected to the end rotating member and the output rotating member, and the output rotating member or the at least one second telescopic link is connected to the at least one first telescopic link to drive the at least one first telescopic link to move.

18. The robot of claim 17, wherein the bidirectional energy storage device further comprises at least one swing rod, each of the at least one swing rod comprises two ends that are respectively connected to the at least one first telescopic link and the at least one second telescopic link, or the two ends of each of the swing rod are respectively connected to the end rotating member and the output rotating member.

19. The robot of claim 17, wherein the elastic member is a compression spring, or the elastic element is a magnetic spring that comprises a plurality of magnets slidably arranged in the sleeve along an axial direction of the sleeve.

20. The robot of claim 17, wherein the at least one first telescopic link and the at least one second telescopic link are both two in number, opposite ends of the two first telescopic links are rotatably connected to the first sliding member and different positions of the end rotating member, and opposite ends of the two second telescopic links are rotatably connected to the second sliding member and different positions of the output rotating member.

* * * * *